United States Patent [19]

Loftin

[11] Patent Number: 5,338,793
[45] Date of Patent: Aug. 16, 1994

[54] ERASABLE INK

[75] Inventor: Rachel M. Loftin, Halifax, Mass.

[73] Assignee: The Gillette Company, Boston, Mass.

[21] Appl. No.: 892,186

[22] Filed: Jun. 2, 1992

[51] Int. Cl.$^5$ ................................................ C08K 9/00
[52] U.S. Cl. ..................................... 524/571; 523/160
[58] Field of Search ......................... 524/571; 523/160

[56] References Cited

U.S. PATENT DOCUMENTS

| | | | |
|---|---|---|---|
| 3,834,823 | 9/1974 | Seregely et al. | 401/198 |
| 3,949,132 | 4/1976 | Seregely et al. | 428/207 |
| 4,256,494 | 3/1981 | Yamamoto et al. | 106/22 |
| 4,762,875 | 8/1988 | Gold | 524/248 |
| 4,877,451 | 10/1989 | Winnik et al. | 106/23 |
| 4,889,765 | 12/1989 | Wallace | 428/288 |
| 4,935,461 | 6/1990 | Nakamura | 524/306 |
| 5,004,763 | 4/1991 | Imagawa | 523/161 |
| 5,062,892 | 11/1991 | Halko | 106/22 |

FOREIGN PATENT DOCUMENTS 63-13759 7/1989 Japan .
62-333821 7/1989 Japan .

*Primary Examiner*—Paul R. Michl
*Assistant Examiner*—Edward Cain
*Attorney, Agent, or Firm*—Fish & Richardson

[57] ABSTRACT

An erasable ink for marking boards is provided which includes a water dispersible pigment, silica, a latex and/or a spreading agent, and water, said ink having the ability to form continuous unbroken lines on a smooth, substantially non-porous surface, said lines being erasable from said surface, after drying, by a dry eraser.

42 Claims, No Drawings

ERASABLE INK

BACKGROUND OF THE INVENTION

The invention relates to erasable inks for use on marker boards.

Marker boards, or "whiteboards", are writing boards which can be used in combination with a pen, instead of chalk, and erased using, e.g., a tissue or soft cloth. These boards typically are plastic or ceramic, and have a smooth, hard, glossy surface.

Erasable inks having specialized properties are required for use with marker boards. It is important that the ink be able to wet the glossy surface, that the ink dry relatively quickly, and that the dried ink be erasable with a tissue, soft cloth or felt eraser. Other desirable properties include minimal shrinkage of the ink during drying, erasability after a period of time, and minimal residue left on the board after erasing. It is also desirable that the ink be suitable for use on most or all types of marker boards, a requirement which is difficult to meet due to the different surface properties of different marker board materials.

Marker board inks are described, e.g., in U.S. Pat. Nos. 3,834,823, 3,949,132 and 4,935,461.

SUMMARY OF THE INVENTION

In general, the invention features, in one aspect, an erasable ink for marking boards having the ability to form continuous unbroken lines on a smooth, substantially non-porous surface. The ink includes a water dispersible pigment, silica, a latex, and water. In preferred embodiments, the ink further includes a spreading agent (e.g., a silicone) and an emulsifier (e.g., a phosphate ester or a sulfonate surfactant). Preferred latexes include a styrene butadiene copolymer.

In another aspect, the invention features an erasable ink for marking boards that includes a water dispersible pigment, silica, a spreading agent, and water. In preferred embodiments, the ink further includes an emulsifier.

In another aspect, the invention features an erasable ink for marking boards that includes from approximately 2 to 8 weight percent of a water dispersible pigment; from approximately 1 to 10 weight percent silica; from approximately 0.1 to 3 weight percent of an emulsifier; from approximately 0.1 to 5 weight percent of a silicone fluid; and sufficient water to provide an ink having a viscosity of from 1 to 20 cps.

In another aspect, the invention features an erasable ink for marking boards that includes a water-dispersible pigment, silica, a spreading agent and water.

The invention also features using the ink of the invention to make marks on a marking board having a smooth, substantially non-porous surface. In preferred embodiments, the ink is provided in a marker; the mark is erased using a dry eraser; and the marking board is a plastic board.

The invention further features a pen for marking boards comprising an outer body; a capillary-feed writing tip at one end of the body; a reservoir included within the body and connected to the writing tip; and within the reservoir an aqueous erasable ink of the invention. In preferred embodiments, the tip comprises polyester fibers.

In another aspect, the invention features an erasable ink for marking boards comprising a water dispersible pigment, a spreading agent, a dust inhibitor, an emulsifier, silica, and water. In preferred embodiments, the dust inhibitor is a latex.

The term "latex", as it is used herein, refers to an aqueous emulsion of a natural or synthetic rubber.

The inks of the invention, unlike conventional solvent based marker board inks, are free of volatile organic solvents, and thus have no unpleasant odor. The aqueous inks are also safer to manufacture and store than solvent based compositions. Further, the inks of the invention exhibit minimal shrinkage during drying, are erasable after a period of time, and erase cleanly, with minimal or no residue left on the board after erasing.

Other features and advantages of the invention will be apparent from the Description of the Preferred Embodiments thereof, and from the claims.

DESCRIPTION OF THE PREFERRED EMBODIMENT

The preferred embodiments include a water dispersible pigment, silica, a spreading agent, an emulsifier, and a latex emulsion.

The water dispersible pigment component provides the ink with the desired color. Enough pigment should be included in the ink to provide an adequate color intensity. The preferred inks include between approximately 2% and 8% pigment by weight, more preferably between approximately 5% and 7%. Pigments which may be used in the invention include water dispersible pigments, which are typically provided in the form of aqueous pigment dispersions. Suitable dispersions include those available from Hoechst Celanese under the tradename FLEXONYL or HOSTAFINE, those available from KVK U.S.A. Inc. under the tradename PREDISOL, those available from Heucotech Ltd. under the tradename HEUCOSPERSE, those available from Nippon Keiko Kagaku, Ltd. under the tradename LUMIKOL, and those available from Mikuni Color Works, Inc. under the tradename TITICACA. The total amount of the pigment dispersion to be added will depend upon the solids level of the dispersion, and will be selected to give an effective amount of the pigment, as described above. Phthalocyanine pigments are generally not preferred, as they exhibit poor erasability in most compositions.

Without being bound to any theory, it is believed that the fumed silica particles help prevent the pigment particles from bonding together, which would hinder erasability. It is preferred that the ink include between approximately 1% and 10% of silica by weight, more preferably between approximately 2% and 8%. Too much silica may result in an ink that is undesirably thick; too little may result in an ink in which many of the pigment particles bond together. It is preferred that the fumed silica be hydrophilic colloidal fumed silica, provided in the form of an aqueous dispersion for ease of handling. A preferred dispersion is available from Cabot Corp., under the tradename CAB-O-SPERSE A-205 or S-109. Other preferred grades of fumed silica are synthetic amorphous silica and Colloidal Silica 130, commercially available from Cabot Corp. It is also preferred that the silica have a primary particle size which is small enough to easily feed through a capillary feed system in a pen and a surface area small enough so that the ink is not overly thick. The preferred silicas have a particle size of less than about 40 nanometers and more preferably between approximately 20 to 40 nanometers, and a surface area between approximately 90 and 380 m²/g, more preferably between approximately 90 and 200 m²/g.

The preferred spreading agents are silicone fluids, either provided as silicone surfactants or as silicone oils. The spreading agent causes the aqueous ink to wet the smooth, glossy surface of the board, and improves erasability after drying. Preferred silicone surfactants are dimethicone copolyol, commercially available from Dow Corning under the tradenames DOW 193 and DOW 190, and polydimethylsiloxane, commercially available from Dow Corning under the tradenames SUPERWETTER Q2-5211 and Q2-5212. Other suitable spreading agents include natural oils, e.g., castor, corn, cottonseed, linseed, safflower, soya or tung oil, and fatty acids, e.g., methyl oleate or methyl myristate. It is preferred that the spreading agent have an HLB (hydrophilic/lipophilic balance) of less than 8. It is preferred that the ink include from about 0.1 to 5 weight percent of the spreading agent. Within this range, preferred levels will depend upon the spreading agent selected, e.g., preferably 0.1 to 1 weight percent if polydimethylsiloxane is selected, and 1 to 5 weight percent if dimethicone copolyol is selected. Higher spreading agent content does not improve the properties of the ink, and may reduce removability, while lower content may result in poor wetting of the marker board.

Preferred emulsifying agents include phosphate ester surfactants, e.g., ETHFAC 361 surfactant, available from Ethox Chemical Co., and EMPHOS CS-1361 surfactant, available from Witco Chemical Co. Other suitable emulsifiers include sulfonate surfactants, e.g., WITCONATE P-10-59 surfactant, available from Witco Chemical Co., and alkyl glycosides. The emulsifier improves the storage stability of the ink by emulsifying the spreading agent in the aqueous component. If an oil is used as the spreading agent, then it is preferred that the oil and emulsifier be mixed with a small amount of water to form an oil-in-water emulsion prior to addition to the composition. If a surfactant is used, the surfactant and emulsifier may be added directly to the composition. Additionally, the emulsifier acts as an "anti-stat", i.e., it reduces the static attraction between the dried ink and the board, preventing residue and "shadows" from clinging to the board during and after erasing. It is preferred that the ink contain from about 0.1 to 3 percent emulsifier, more preferably about 0.5 to 2 percent. Higher levels of the emulsifier may result in an ink having very low surface tension, which makes the dried ink more difficult to erase, while lower levels may result in the spreading agent not being properly emulsified.

Preferred latexes include emulsions of synthetic butadiene copolymers, e.g., styrene butadiene latexes. A particularly preferred styrene butadiene latex is available from Goodyear Tire & Rubber Co., under the tradename PLIOLITE LPF 2108. Other preferred styrene butadiene latexes are those which include from about 25 to 25 weight percent styrene and about 65 to 75 weight percent butadiene. It is believed that the latex adds to the erasability of the ink by "picking up" silica particles and other residue during erasing. It is preferred that the ink contain from about 0.5 to 2.5 weight percent solids of the styrene butadiene copolymer. The total amount of latex to be added will depend upon the solids content of the latex selected, but is generally from about 1 to 10 weight percent of the composition. Too little latex may result in excess dust remaining on the marker board surface after the dry ink is erased, while too much may result in difficulty in erasing the dried ink.

The compositions can include other ingredients. For example, the silica may be used in conjunction with another water-dispersible filler which does not swell in or thicken water, e.g. boron nitride, talc, or non-swelling clays. Preferably the composition includes less than about 1 percent by weight of the non-silica filler. Also, the composition may include from about 0.5% to 10% by weight of a glycol ether solvent, e.g. glycol butyl ether, to enhance the wetting properties of the composition.

Sufficient water should be included in the ink so that its Brookfield viscosity at 25° C. is less than about 20 cps, more preferably between about 2 cps and 10 cps. The viscosity may be as low as may be obtained while still including effective amounts of the other components of the composition. If the viscosity is too high, the ink may be too thick for practical use, particularly in capillary feed systems.

The compositions generally can be prepared by blending the ingredients under conditions of high shear.

The following example illustrates the invention.

EXAMPLE

A series of ink compositions were formed by mixing the ingredients shown in Table 1. In compositions 2 and 4, in which a silicone oil was used as the spreading agent, the oil was emulsified with the emulsifier and a small amount of the water prior to addition to the composition. In compositions 3 and 6, in which loose silica was used, rather than a silica dispersion, the silica was dispersed in a portion of the water prior to addition to the composition. The compositions were mixed using a Ross laboratory dispersator.

The inks were applied to both PORCELLE ceramic and melamine formaldehyde marker boards. All of the inks dried within about 30 seconds, with no detectable odor, to form continuous unbroken lines, exhibiting minimal shrinkage. After drying, the inks were erased using a soft cloth, leaving the boards clean and virtually free from residue and staining. The small amount of residue remaining on the boards was easily removed with a water-based cleaner.

TABLE 1

| Components | Samples | | | | | |
|---|---|---|---|---|---|---|
| | 1 | 2 | 3 | 4 | 5 | 6 |
| CAB-O-SPERSE S109 silica dispersion | 55 | 60 | — | 60 | 60 | — |
| AEROSIL MOX 80 silica | — | — | 5 | — | — | — |
| AEROSIL 90 silica | — | — | — | — | — | 6 |
| FLEXONYL ACB pigment dispersion | 7 | — | 10 | — | — | — |
| HOSTAFINE TS pigment dispersion | — | — | — | 10 | — | 12 |
| HOSTAFINE F6B pigment dispersion | — | — | — | — | 1 | — |
| HEUCOSPERSE REFLEX BLUE pigment disp. | — | 8 | — | — | — | — |
| LUMIKOL NKW 3007 pigment dispersion | — | — | — | — | 19 | — |
| SUPERWETTER Q2-5212 polydimethyl siloxane | 0.5 | 0.5 | 0.5 | 0.5 | — | — |
| Silicone Oil | — | 4 | — | 4 | — | — |
| DOW 190 dimethicone copolyol | — | — | 2 | — | 2 | — |
| DOW 193 dimethicone copolyol | 2 | — | — | — | — | 2 |
| ETHFAC 361 emulsifier | 2 | — | — | — | — | 0.5 |

TABLE 1-continued

| Components | Samples | | | | | |
|---|---|---|---|---|---|---|
| | 1 | 2 | 3 | 4 | 5 | 6 |
| EMPHOS CS-1361 emulsifier | — | 1 | 0.5 | — | 1 | — |
| WITCONATE P-10-59 emulsifier | — | — | — | 1 | — | — |
| PLIOLITE LPF-2108 latex | 2 | 2 | 1 | 1.5 | 2 | 2 |
| DOWANOL DB glycol butyl ether | — | — | — | — | 5 | — |
| water | 31.5 | 24.5 | 81.0 | 21.0 | 10.0 | 77.5 |

The preferred inks can be used in conventional capillary feed markers that preferably include a polyester fiber tip (or nib) connected to an ink reservoir, preferably also made of polyester fiber. Other types of nibs, e.g., acrylic fibers, may be used. The reservoir is surrounded by, e.g., a polypropylene barrel, and is capped at the end opposite the nib with, e.g., a polypropylene plug; the marker also includes a polypropylene cap for covering the nib. The reservoirs are available from, e.g., American Filtrona Co. of Richmond, Va., or Baumgartner, Germany. The nibs are available from e.g., Aubex Co. of Tokyo, Japan, Teibow or Porex. During use, because the ink has a relatively low viscosity, the ink is drawn from the reservoir by the tip by capillary action.

The preferred inks are suitable for use on any conventional marker board, for example those available from Weber-Costello.

The most preferred inks dry relatively quickly, e.g. less than about 30 seconds. These inks also are easily erasable, using a tissue or soft cloth, for a period of time after marking, and erase to leave no significant residue or shadows on the board.

Other embodiments are within the claims.

I claim:

1. An erasable ink for marking boards comprising a water dispersible pigment, silica, a latex, and water, said ink having the ability to form continuous unbroken lines on a smooth, substantially non-porous surface without forming a continuous film, said lines being erasable from said surface, after drying by a dry eraser.

2. The ink of claim 1 further comprising a spreading agent.

3. The ink of claim 2 wherein said spreading agent comprises a silicone fluid.

4. The ink of claim 1 or 2 further comprising an emulsifier.

5. The ink of claim 4 wherein said emulsifier is selected from the group consisting of phosphate ester surfactants and sulfonate surfactants.

6. The ink of claim 1 wherein said latex comprises a styrene butadiene copolymer.

7. An erasable ink for marking boards comprising a water dispersible pigment, silica, a spreading agent, an emulsifier, and water, said ink having the ability to form continuous unbroken lines on a smooth, substantially non-porous surface without forming a continuous film, said lines being erasable from said surface, after drying, by a dry eraser.

8. The ink of claim 7 wherein said spreading agent comprises a silicone fluid.

9. The ink of claim 8 wherein said silicone fluid is a silicone surfactant.

10. The ink of claim 7 wherein said emulsifier is selected from the group consisting of phosphate ester surfactants and sulfonate surfactants.

11. An erasable ink for marking boards comprising:
from approximately 2 to 8 weight percent of a water dispersible pigment;
from approximately 1 to 10 weight percent silica;
from approximately 0.1 to 3 weight percent of an emulsifier;
from approximately 0,1 to 5 weight percent of a silicone fluid;
a latex; and
sufficient water to provide an ink having a viscosity of from 1 to 20 cps;
said ink having the ability to form continuous unbroken lines on a smooth, substantially non-porous surface without forming a continuous film, said lines being erasable from said surface, after drying, by a dry eraser.

12. The ink of claim 11 wherein said latex comprises a styrene butadiene copolymer.

13. A method of writing on a marking board comprising the steps of
providing an ink comprising a water dispersible pigment, silica, a latex, and water; and
making a mark with said ink on a marking board having a smooth, substantially non-porous surface without forming a continuous film.

14. A method of writing on a marking board comprising the steps of
providing an ink comprising a water dispersible pigment, silica, a spreading agent, an emulsifier and water; and
making a mark with said ink on a marking board having a smooth, substantially non-porous surface without forming a continuous film.

15. The method of claim 13 or 14 wherein said ink is provided in a marker.

16. The method of claim 13 or 14 further comprising the step of erasing the mark.

17. The method of claim 16 wherein the mark is erased using a dry eraser.

18. The method of claim 13 or 14 wherein the marking board is a plastic board.

19. A pen for marking boards comprising an outer body; a capillary-feed writing tip at one end of said body; a reservoir included within said body and connected to said writing tip; and within said reservoir an aqueous erasable ink comprising a water dispersible pigment, silica, a latex, and water, said ink having the ability to form continuous unbroken lines on a smooth, substantially non-porous surface without forming a continuous film, said lines being erasable from said surface, after drying, by a dry eraser.

20. The pen of claim 19 wherein said ink further comprises a spreading agent.

21. The pen of claim 19 or 20 wherein said spreading agent comprises a silicone fluid.

22. The pen of claim 20 wherein said ink further comprises an emulsifier.

23. The pen of claim 22 wherein said emulsifier is selected from the group consisting of phosphate ester surfactants and sulfonate surfactants.

24. The pen of claim 19 wherein said latex comprises a styrene butadiene thermoplastic copolymer.

25. The pen of claim 17 wherein said tip comprises polyester fibers.

26. A pen for marking boards comprising an outer body; a writing tip at one end of said body; a reservoir included within said body and connected to said writing tip; and within said reservoir an aqueous erasable ink comprising a water dispersible pigment, silica, a spreading agent, and water, said ink having the ability to form continuous unbroken lines on a smooth, substantially non-porous surface without forming a continuous film, said lines being erasable from said surface, after drying, by a dry eraser.

27. The pen of claim 26 wherein said spreading agent comprises a silicone fluid.

28. The pen of claim 26 wherein said ink further comprises an emulsifier.

29. The pen of claim 28 wherein said emulsifier is selected from the group consisting of phosphate ester surfactants and sulfonate surfactants.

30. An erasable ink for marking boards comprising a water dispersible pigment, a spreading agent, a dust inhibitor, an emulsifier, silica, and water,
   said ink having the ability to form continuous unbroken lines on a smooth substantially non-porous surface without forming a continuous film.

31. The ink of claim 30 wherein said ink has the ability to form continuous unbroken lines on a smooth, substantially non-porous surface, said lines being erasable from said surface, after drying, by a dry eraser.

32. The ink of claim 30 wherein said dust inhibitor comprises a latex.

33. The ink of claim 32 wherein said latex comprises a styrene butadiene thermoplastic copolymer.

34. The ink of claim 30 wherein said spreading agent comprises a silicone fluid.

35. The ink of claim 30 wherein said emulsifier comprises a phosphate ester surfactant.

36. The ink of claim 30 comprising from 2 to 8 weight percent of said pigment, from 0.1 to 5 weight percent of said spreading agent, from 0.5 to 2.5 weight percent of said dust inhibitor, from 0.1 to 3 weight percent of said emulsifier, from 1 to 10 weight percent silica, and from 70 to 95 weight percent water.

37. The erasable ink of claim 1, wherein said ink has a viscosity of less than 20 cps.

38. The method of claim 13, wherein said ink has a viscosity of less than 20 cps.

39. The method of claim 14, wherein said ink has a viscosity of less than 20 cps.

40. The pen of claim 19, wherein said ink has a viscosity of less than 20 cps.

41. The pen of claim 26, wherein said ink has a viscosity of less than 20 cps.

42. The erasable ink of claim 30, wherein said ink has a viscosity of less than 20 cps.

* * * * *